(12) United States Patent
Enochs

(10) Patent No.: US 8,462,432 B2
(45) Date of Patent: *Jun. 11, 2013

(54) TENSIONED PROJECTION SCREEN

(75) Inventor: Steven E. Enochs, New Palestine, IN (US)

(73) Assignee: Draper, Inc., Spiceland, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/568,647

(22) Filed: Aug. 7, 2012

(65) Prior Publication Data

US 2012/0300297 A1    Nov. 29, 2012

Related U.S. Application Data

(63) Continuation of application No. 13/099,505, filed on May 3, 2011, now Pat. No. 8,238,023, which is a continuation of application No. 11/846,279, filed on Aug. 28, 2007, now Pat. No. 7,936,505.

(60) Provisional application No. 60/840,583, filed on Aug. 28, 2006.

(51) Int. Cl.
G03B 21/56 (2006.01)

(52) U.S. Cl.
USPC ........................................................ 359/443

(58) Field of Classification Search
USPC .......................... 359/461, 443; 160/238, 240
See application file for complete search history.

(56) References Cited

U.S. PATENT DOCUMENTS

| 3,211,089 | A | * | 10/1965 | Messerschmitt | ........... | 101/127.1 |
| 6,873,458 | B1 | * | 3/2005 | Bakkom et al. | ............... | 359/443 |
| 7,936,505 | B2 | * | 5/2011 | Enochs | .......... | 359/443 |
| 8,238,023 | B2 | * | 8/2012 | Enochs | .......... | 359/443 |

* cited by examiner

Primary Examiner — Christopher Mahoney
(74) Attorney, Agent, or Firm — Faegre Baker Daniels LLP

(57) ABSTRACT

A projection screen apparatus having a perimeter frame and a substantially blank screen is provided.

22 Claims, 7 Drawing Sheets

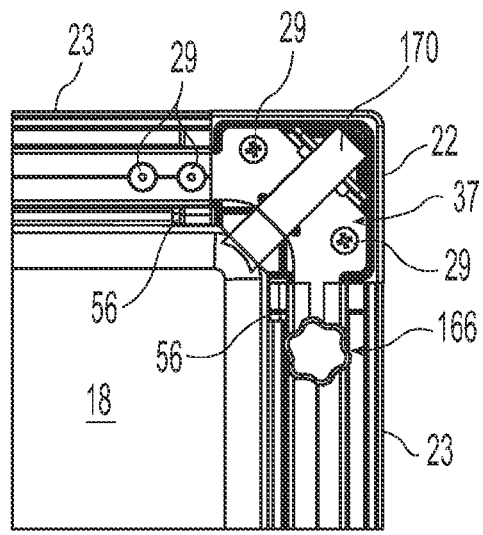
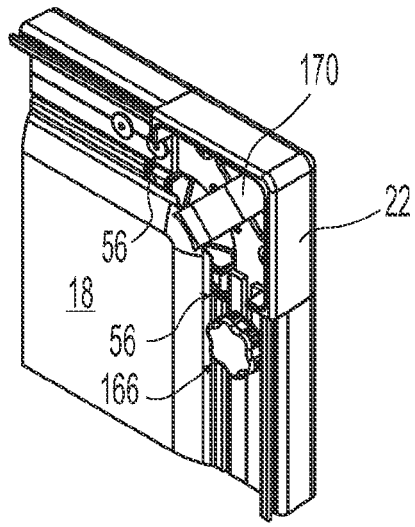
Fig. 5A    Fig. 5B
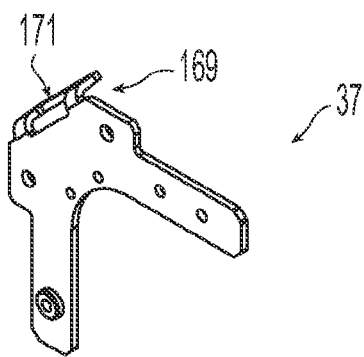
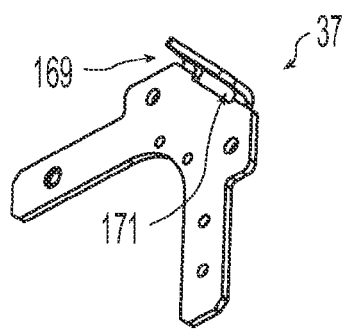
Fig. 6A    Fig. 6B
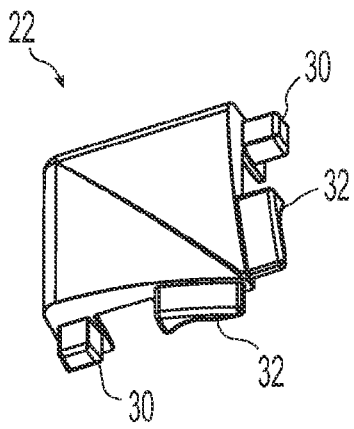
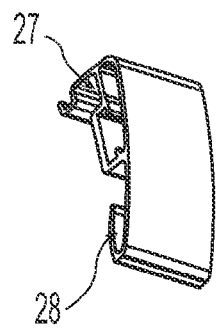
Fig. 7    Fig. 8

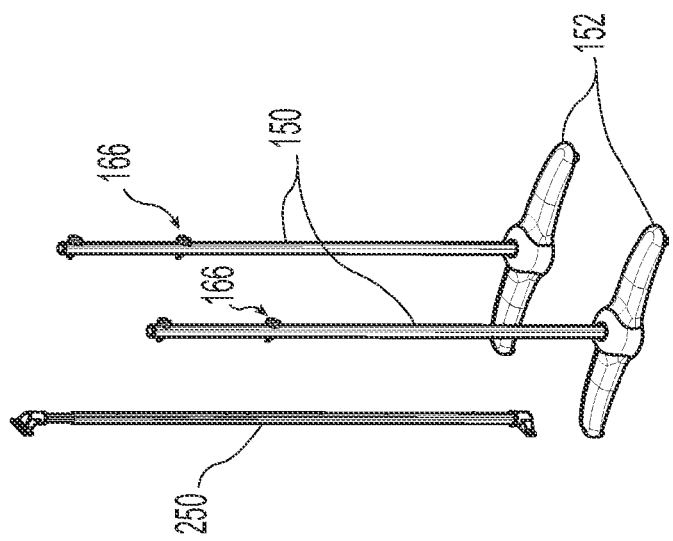
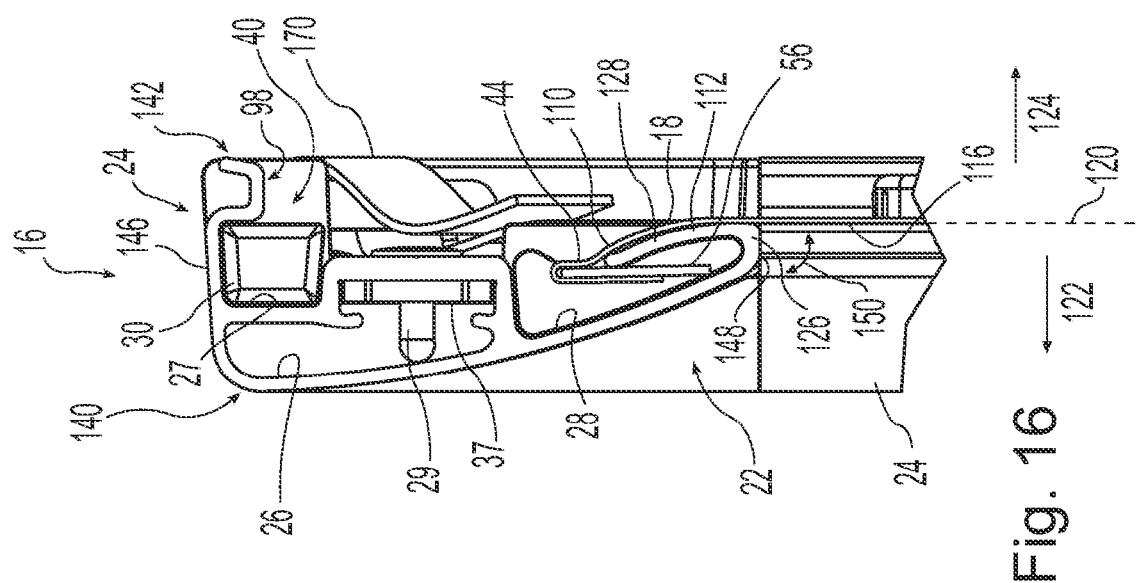

TENSIONED PROJECTION SCREEN

RELATED APPLICATIONS

The present application is a continuation of U.S. patent application Ser. No. 13/099,505, filed May 3, 2011, now U.S. Pat. No. 8,238,023, which is a continuation of U.S. patent application Ser. No. 11/846,279, filed Aug. 28, 2007, now U.S. Pat. No. 7,936,505, which claims priority to U.S. Provisional Patent Application Ser. No. 60/840,583, filed Aug. 28, 2006, the entire disclosures of which are expressly incorporated by reference herein.

BACKGROUND AND SUMMARY OF THE INVENTION

The present invention relates to projection screens. More particularly, the present invention relates to tensioned projection screens.

According to one exemplary embodiment of the present invention, a projection screen apparatus is provided. The projection screen comprises a perimeter frame including side members and a substantially blank screen tensioned on the perimeter frame. The screen has a substantially flat display portion and a perimeter portion coupled to the perimeter frame. The side members include a tube portion and a track extending from the tube portion. The track receives the perimeter portion therein.

According to another exemplary embodiment of the present invention, a projection screen apparatus is provided. The apparatus comprises a perimeter frame configured to couple to a wall mount, a substantially blank screen tensioned on the perimeter frame, and at least one leg configured to couple to the perimeter frame to support the apparatus on a floor.

According to another exemplary embodiment of the present invention, a projection screen apparatus is provided. The apparatus comprises a perimeter frame including side members and corner members, the corner member is fixedly coupled to a first side member and selectively coupled to a second side member; and a substantially blank screen tensioned on the perimeter frame.

According to another exemplary embodiment of the present invention, a projection screen apparatus is provided. The apparatus comprises a perimeter frame including side members and corner members and a substantially blank screen tensioned on the perimeter frame. The screen has a substantially flat display portion and a perimeter portion coupled to the perimeter frame. The side members includes a track. The corner members includes a mount. The screen apparatus further includes a coupler coupled to the screen and received by the mount of the corner member.

According to another exemplary embodiment of the present invention, a projection screen apparatus is provided. The apparatus comprises a perimeter frame including side member segments, each side member segment defining a longitudinal axis, a substantially blank screen tensioned on the perimeter frame, the screen having a substantially flat display portion defining a display plane, and a coupler including a first surface such that causing the first surface to engage abutting side member segments aligns the side member segments in a common plane parallel to the display plane, the coupler also including at least one second surface, causing the at least one second surface to engage abutting side member segments aligns the longitudinal axes of the abutting side member segments.

Additional features of the present invention will become apparent to those skilled in the art upon consideration of the following detailed description of an illustrated embodiment exemplifying the best mode of carrying out the invention as presently perceived.

BRIEF DESCRIPTION OF THE DRAWINGS

A detailed description particularly refers to the accompanying figures in which:

FIG. 5A is back view of a portion of the projection screen apparatus showing two side frame members coupled to a corner frame member and a screen coupled to the frame members and corner member;

FIG. 5B is a perspective view similar to FIG. 5A;

FIG. 6A is a perspective view of a left corner bracket;

FIG. 6B is a perspective view of a right corner bracket;

FIG. 7 is a perspective view of a corner frame member;

FIG. 8 is a perspective view of a portion of a side frame member;

FIG. 16 is a cross-sectional view taken along line 16-16 of FIG. 1 showing the coupler in a first location relative to the frame member; and FIG. 17 is a perspective view of legs and a support member for the projection screen apparatus of FIG. 1.

DETAILED DESCRIPTION OF THE DRAWINGS

Figure 1:
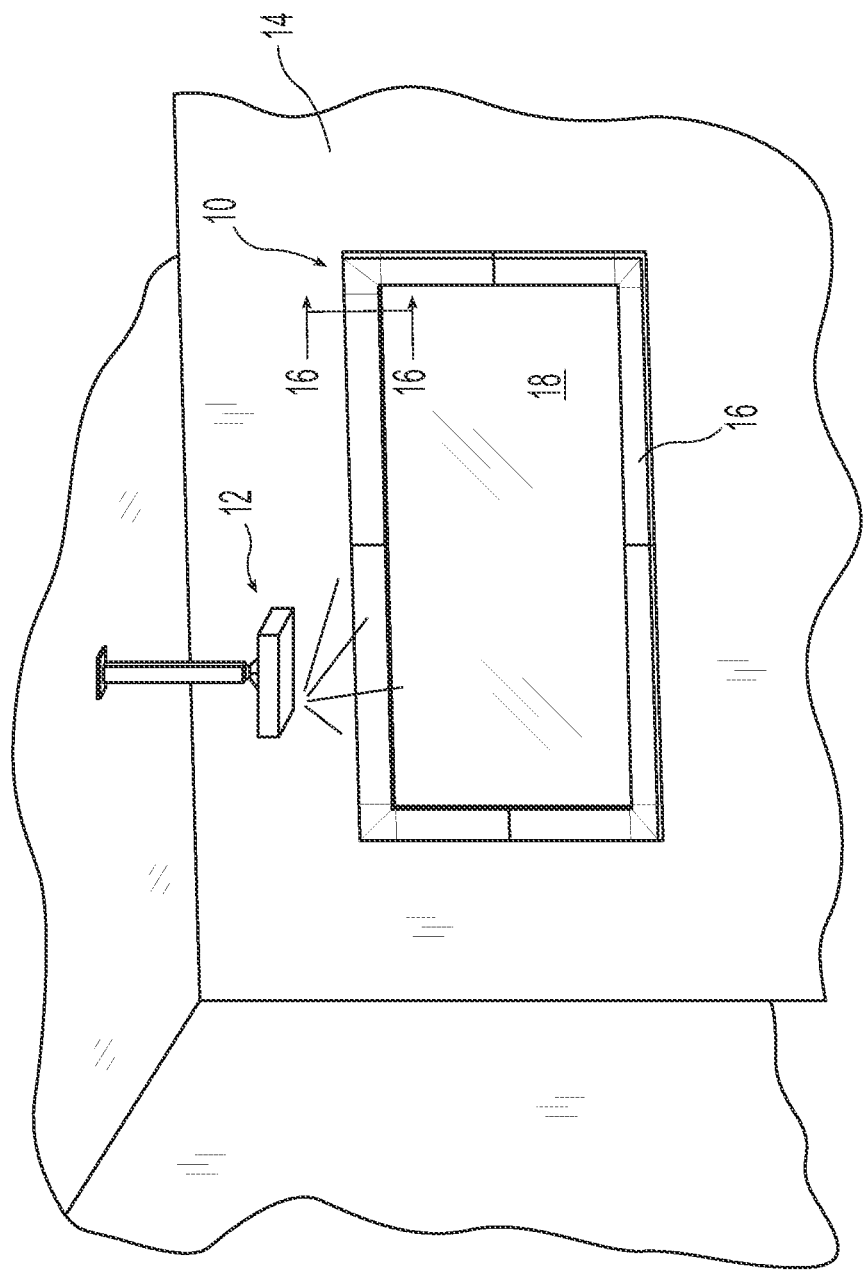
FIG. 1 is a perspective view of a room showing a projector projection an image on a projection screen apparatus according to the present disclosure.

According to the present disclosure, a projection screen apparatus 10 is provided to display images projected by a projector 12. Typically, projection screen apparatus 10 is mounted to a wall 14 of a structure, such as an entertainment room of a residence or conference room of a business. As shown in FIG. 1, projector 12 is positioned on the audience side of projection screen apparatus 10 to reflect back the images projected by projector 12 to an audience. According to alternative installations, projector 12 is positioned for a rear projection application on the back side of projection screen apparatus 10 so that images projected by projector 12 are displayed through projection screen apparatus 10 to the audience. In some installations, speakers (not shown) are positioned behind the projection screen apparatus 10 so that the sound is transmitted through projection screen apparatus 10. Additionally, projection screen apparatus 10 is provided with removable legs 150, as shown in FIG. 17, each having a base 152 to support screen apparatus 10 on a floor, table, or other structure.

Figure 2:
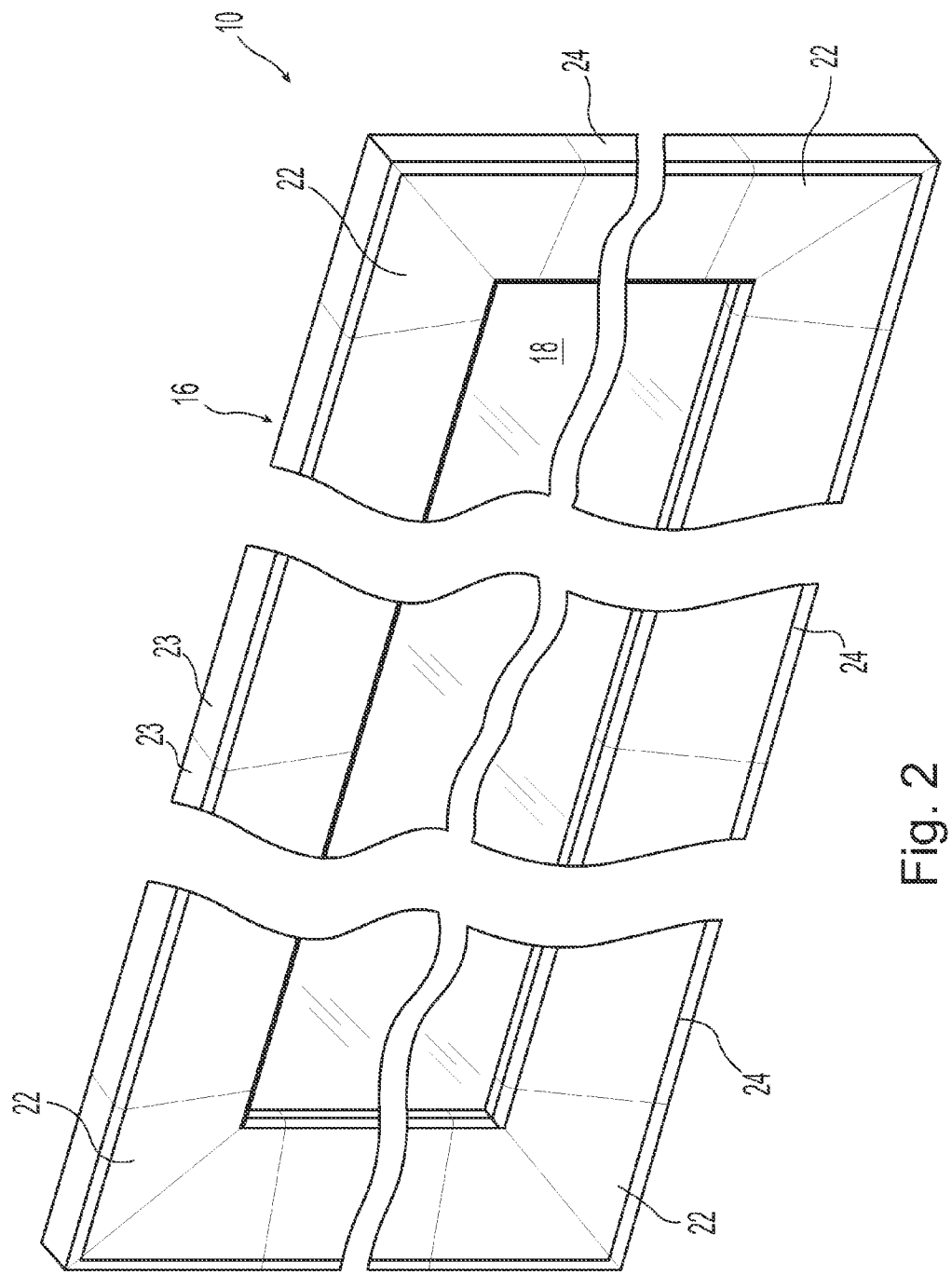
FIG. 2 is a perspective view of four corners of the projection screen apparatus of FIG. 1.
Figure 15:
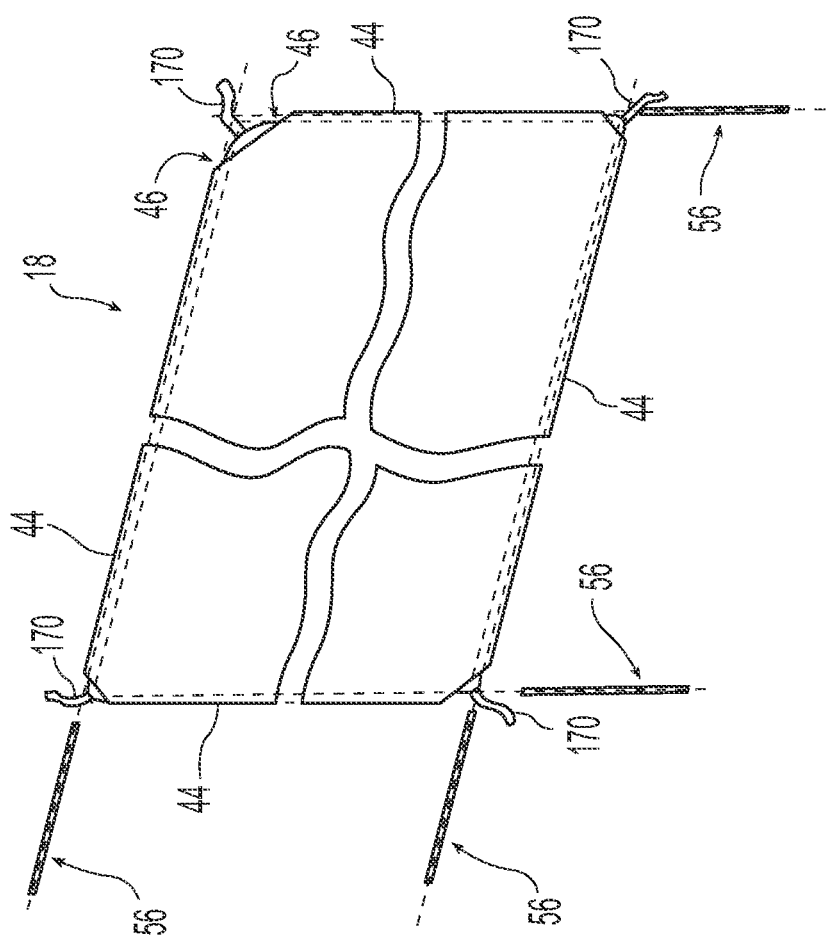
FIG. 15 is a perspective view of a wall mount coupled to the perimeter frame and a wall of a structure.

As shown in FIG. 2, projection screen apparatus 10 includes a perimeter frame 16 and a projection screen 18 tensioned on frame 16. As shown in FIG. 15, projection screen apparatus 10 further includes a plurality of flat retention rods 56 that couple projection screen 18 to frame 16 as shown in FIG. 16. Rods 56 are shown as relatively flat members but may also be round in cross section or may be any other shape that allows screen 18 to be held thereby within tracks 28 formed in frame 16. As shown in FIG. 16, Each retention rod 56 is positioned in track 28 in frame 16.

Frame 16 includes four corner members 22 and a plurality of extended frame members 24 extending between corner members 22 as shown in FIG. 2. Each frame member 24 is made of extruded aluminum and includes a channel 26 and at least one track 28. Channel 26 is formed as a tube that is located a position including the center of the cross section as shown in FIG. 16. Track 28 extends from channel 26 to allow for coupling with screen 18.

Depending on the size of projection screen apparatus 10, each frame member 24 may be segmented to reduce the length of screen apparatus during storage. Frame member 24 may include one or more segments 23. According to other embodiments, frame members 24 are not segmented.

Each corner member 22 is made of ABS plastic and includes a pair of posts 30, 32 sized to fit within a respective recess 27 and tracks 28 of respective frame members 24. During assembly, posts 30, 32 are slid into respective channels 26 and tracks 28 of each respective frame member 24 to define a rectangular perimeter.

Each connecting frame piece, including frame members 24 and corner members 22, is coupled to abutting members 22, 24 via a respective corner bracket 37 or connecting side member bracket 25. Corner brackets 37 are coupled to corner members 22 via screws or bolts 29. Frame members 24 and corner members 22, in one embodiment, are provided to an end user as separate pieces ready for assembly by the end user. Each frame member 24 includes one end that is configured to fixedly couple to a connecting side member bracket 25 or corner bracket 37 via a pair of screws (hereinafter referred to as the "fixed end"). Such a connection is considered a fixed connection in that a tool, such as a screwdriver is necessary to remove the set screw to disconnect the pieces. Each frame member 24 also includes an opposite end that is configured to selectively and removably couple to a connecting side member bracket 25 or corner bracket 37 via a thumb screw 166 received in a slot 154 (hereinafter referred to as the "removable end"). Such a connection is considered to be selectively coupled in that the connection can be undone without the use of a tool such as a screw driver, i.e. removal of thumbscrew 166. Such a connection is readily coupled and uncoupled in that no tools are necessary. Connecting bracket 25 and corner brackets 37 include a fixed end 160 having two threaded bores for receiving screws 29 and a removable end 162 having one threaded bore 164 therein for receiving a thumbscrew 166. Connecting brackets 25 and corner brackets 37 span between adjacent frame members 24 and corner members 22 to bridge therebetween.

As shown in FIG. 16, channel 26 of each frame member 24 includes an inner surface sized and shaped to couple to connecting side member bracket 25 or corner bracket 37. Channel 26 of fixed end of frame members 24 receive the fixed end of connecting side member bracket 25 or corner bracket 37 therein such that the connecting side member bracket 25 or corner bracket 37 is fixed therein via screws 29 received in aligned bores in connecting/corner bracket 25, 37 and frame members 24. When so fixed, the removable end of the side member bracket 25, 37 extends out of channel 26 of the frame member 24 or corner member 22. The removable end of bracket 25, 37 is then received by channel 26 of a removable end of another frame member 24 and secured thereto via a thumbscrew 166 that passes through slot 154 of the removable end and is received in a bore of bracket 25, 37.

Figure 3A:
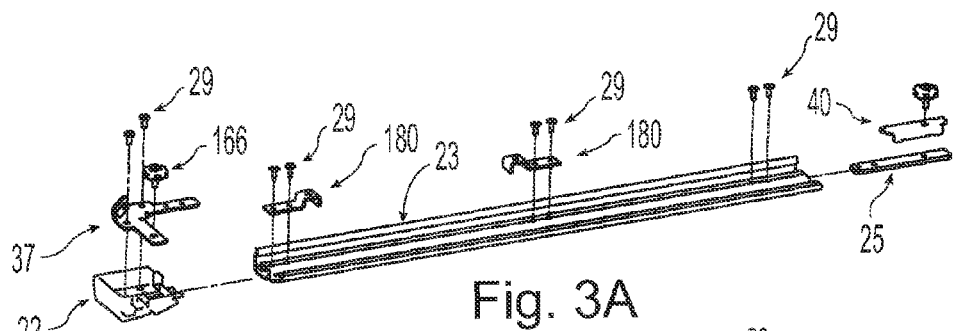
FIG. 3A is an exploded perspective view of portion of a frame of the projection screen apparatus of FIG. 1.
Figure 3B:
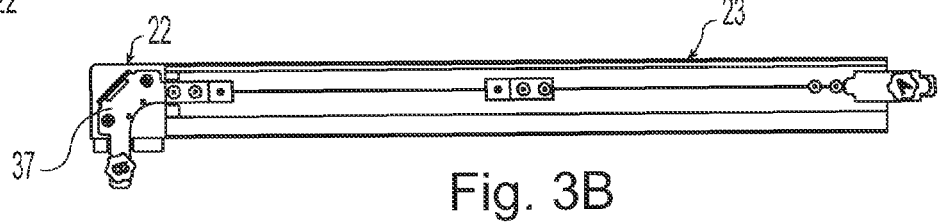
FIGS. 3B and 3C are back and side views of the portion of the frame shown in FIG. 3A.
Figure 3C:

When two segments 23 of a side frame member 24 are being coupled via a connecting side member bracket 25, an exposed rear surface of channel 26 receives an aluminum connector or clamp 40 thereon, see FIG. 3A. Clamp or coupler 40 includes a bore to receive thumbscrew 166 therein. When secured to frame members 24, aluminum clamp 40 spans the seam or joint created by the abutting segments 23. Thumbscrew 166 passes through the bore in clamp 40, slot 154 of frame member 24, and the bore in connecting side member bracket 25 to achieve the aligned coupling of adjacent frame members 24. Preferably, clamp 40 is installed such that thumbscrew 166 places frame member 24 under slight compression between clamp 40 and connecting side member bracket 25. Clamp 40 includes side flanges 41. Abutting segments 23 of frame members 24 are aligned clamp 40 in the direction of thumbscrew compression. Abutting segments 23 of frame members 24 are aligned in the direction that is both perpendicular to the frame member 24 and perpendicular to the compression direction by the flanges 41. Abutting segments 23 of frame members 24 are secured in the direction of frame members by seating thumbscrew 166 at the desired place in slot 154. The tension of the screen 18, as discussed in greater detail below, also aids in the securing of the frame members in the direction 560 of the frame members 24.

Figure 4A:
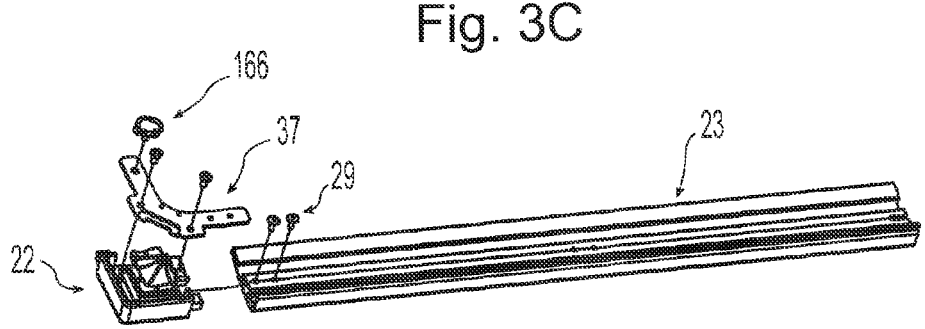
FIG. 4A is an exploded perspective view of portion of a frame of the projection screen apparatus of FIG. 1.
Figure 4C:
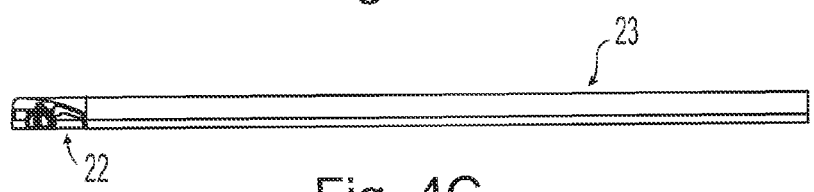
FIGS. 4B and 4C are back and side views of the portion of the frame shown in FIG. 4A.
Figure 4B:
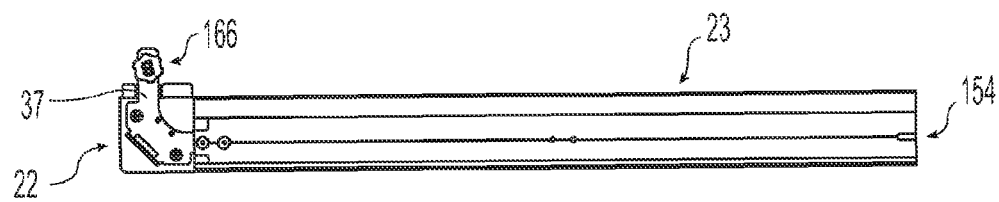
Figure 9:
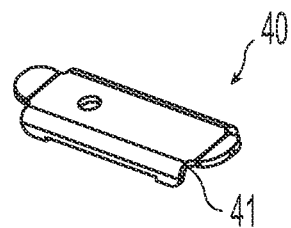
FIG. 9 is a perspective view of a clamp provided to couple adjacent segments of a side frame member together.
Figure 10:
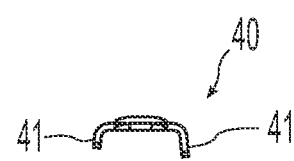
FIG. 10 is an end view of the clamp of FIG. 9.
Figure 11:
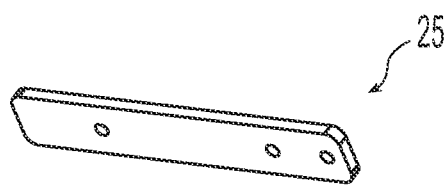
FIG. 11 is a perspective view of a side member bracket provided to couple adjacent segments of a side frame member together.
Figure 12:
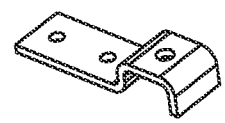
FIG. 12 is a perspective view of a leg support bracket provided to couple a support leg to the frame.
Figure 13A:
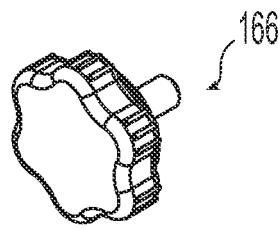
FIG. 13A is a perspective view of a knob or thumbscrew provided to couple frame members together.
Figure 13B:
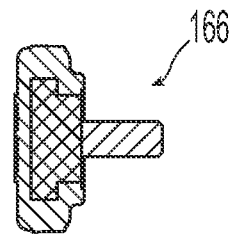
FIG. 13B is a cross-sectional view of the knob of FIG. 13.

Prior to shipment from the factory, portions of frame 16 are fixedly secured together as subassemblies. For example, as shown in FIGS. 3A and 4A, a corner member 22 is fixedly coupled to a segment 23 of side frame member 24. Additionally, a clamp 40, bracket 25, and a pair of thumbscrews 166 are fixedly coupled to the subassembly to permit removably coupling of adjacent segments 23 to each other or a segment 23 to a corner member 22. Prior to shipment to a distributor or retailer, corner bracket 37 are fixedly secured to corner member 22 by screws 29, segment 23 is fixedly coupled to bracket 37 by screws 29, and bracket 25 is fixedly secured to the opposite end of segment 23. The lower threaded end of one knob or thumbscrew 166 is threaded through a threaded hole in corner bracket 37. After the lower threaded portion is through the threaded hole, a few of the upper threaded on the lower threaded portion are deformed so that knob 166 can not be backed out of the threaded hole in bracket 37. Similarly, another knob 166 is threaded into a threaded aperture in bracket 25 and one or more threaded are deformed to prevent removal of knob 166. However, before knob 166 is coupled to bracket 25, the lower end of knob 166 is inserted through a clamp 40. Thus, after the threaded are deformed, both clamp 40 and knob 166 are fixedly secured to bracket 25. A similar subassembly is shown in FIGS. 4A-4C.

Depending on the location of a subassembly around frame 16, it will include fewer or more components. In the exemplary embodiment, the upper left side subassembly includes segment 23, a corner assembly (corner member 22, corner bracket 37, and knob 166) and a clamp assembly (clamp 40, bracket 25, and knob 166). The lower left side subassembly includes segment 23 with slot 154, a corner assembly, and leg mounts 180 (discussed below). The lower left bottom subassembly includes segment 23 with slot 154 and a clamp assembly. The lower bottom right "subassembly" includes segment 23 with two slots 154 at opposite ends. The lower right side subassembly includes segment 23, a corner assembly, a clamp assembly, and leg mounts 180. The upper right side subassembly includes segment 23 with slot 154 and a corner assembly. Upper right top subassembly includes segment 23 with slot 154 and a clamp assembly. The upper left top "subassembly" includes segment 23 with two slots 154 at opposite ends. According to alternative embodiments, different combinations of subassemblies are provided or the components are not provided as subassemblies to the distributor or retailer.

When shipped from the factory, a total of eight subassemblies are provided in an exemplary embodiment. The eight subassemblies are aligned with each other and placed in an elongated package. Preferably, the longest subassembly is about 48 inches or less. Restricting the subassemblies to about 48 inches in length allows the projection screen apparatus 10 to be packaged for consumers such that the overall package length does not exceed about 48 inches. According to alternative embodiments, subassemblies less than about 36 inches are provided. According to other alternative embodiments, subassemblies longer than about 48 inches are provided. Screen 18 is rolled or folded prior to shipping and placed in the package in the rolled and/or folded state. Because coupler 56 is coupled to screen 18, it is likewise rolled and/or folded. Preferably, coupler 56 is not creased as a result of the rolling and/or folding.

When a retail customer removes the subassemblies from the package, the various subassemblies are assembled to create frame 16. To assembly frame 16, the respective portions of brackets 25, 37 are slid into the corresponding portion of channel 26. Next, each respective knob 166 is threaded into the threaded hole of the respective bracket 25, 37. When tightened, clamp 40 aligns respective segments 23 as discussed above. After frame 16 is assembled, screen 18 is unrolled/unfolded and coupled to frame 16.

Screen 18 may be made of a number of materials suitable for projection screen applications. Preferably, screen 18 has a reflectivity gain from about 0.4 to about 2.5. Front projections screens are preferably white or light gray in appearance. Rear projection screens are preferably light gray in color and translucent to permit the projected image to transmit through the screen and be displayed to the audience. Some of the screens are acoustically transparent, like speaker cover fabric, to permit sound to be transmitted through the screen. Additionally, screen 18 includes hook and loop material (Velcro) straps 170 attached to corners thereof to interface with corner brackets 37.

According to one embodiment, the screen includes a woven fiberglass backing with a vinyl reflective surface laminated to the fiberglass (gain of approximately 1.0). According to one embodiment, microscopic glass beads are provided on the viewing surface (gain from about 0.5 to about 2.5 depending on the viewing angle). According to another embodiment, the screen is made of a white (gain of about 1.0 or from about 0.4 to about 2.2 depending on the viewing angle) or light gray (gain of about 0.6 to 0.9 depending on the viewing angle) vinyl material without a backing Other suitable projection screens known to those of ordinary skill in the art may also be provided. Preferably the screen is substantially blank so that it is substantially free of printing or other markings that noticeably detract from the images projected on the screen.

According to one embodiment, the substantially blank screen is provided with black borders that frame the screen for "wide screen" or other projection formats.

Before shipment to the distributor or retailer, retention rods 56 are positioned adjacent to projection screen 18. Screen 18 is folded over as shown in FIG. 16. Retention rod 56 is then sewn to screen 18 so that the thread extends through rod 56 and into each side of screen 18 at location 44 as shown in FIG. 16. Four such rods 56 are sewn into screen 18. As shown in FIGS. 5A and 5B, Preferably, retention rods 56 are flat strips made of HDPE plastic.

Screen 18 with rods 56 are typically provided in the package with the frame subassemblies. To set up screen assembly 10, screen 18 is coupled to assembled frame 10 to tension screen 18 on frame 16. To initially position screen 18 on frame 16, straps 170 are coupled to each respective corner brackets 37 to hold screen 18 in position for further assembly. As shown in FIGS. 6A and 6B, each bracket 37 includes mount 169 includes an aperture 171 to receive a strap 170 that is looped back and secured to itself to couple a corner of screen 18 to frame 16.

With screen 18 held relative to frame 16 with straps 170, each respective rod 56 is positioned in track 28 as shown in FIG. 16. To position rod 56 in track 28, screen 18 is slightly stretched until a portion of track 28 is trapped between screen 18 and rod 56. Because rod 56 is wider than track 28, it will not rotate out of track 28 and the tension provided by screen 18 pulls rod 56 inward toward the center of screen 18.

As mentioned above, rod 56 is shorter than screen 18 and is shorter than each adjacent frame member 24. The extra length of the adjacent frame member 24 provides enough room for posts 32 of corner members 22 to occupy track 28 along with rod 56 to avoid interference therebetween. After rods 56 are positioned in respective tracks 28, hook-and-loop straps 170 can be repositioned on mounts 169 to provide tension in screen 18 at the corners.

Figure 14:
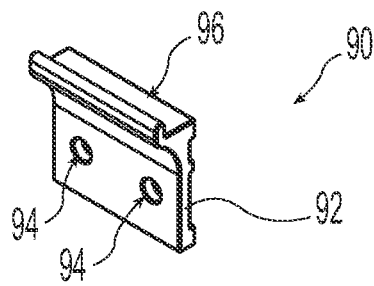
FIG. 14 is an exploded perspective view of a projection screen and four couplers configured to couple the screen to the frame.

After screen 18 is coupled to frame 16, frame 16 is mounted to wall 14. As shown in FIG. 14, projection screen apparatus 10 includes a pair of wall couplers or mounts 90 that are coupled to wall 14 and frame 16 to support perimeter frame 16 on wall 14. Wall coupler 90 is made of extruded plastic or aluminum and includes a first flange 92 including a plurality of fastener-receiving apertures 94 and a second flange 96.

During installation, one or more wall couplers 90 are coupled to wall 14 with second flange 96 extending upwardly. Preferably, wall couplers 90 are positioned at the same level so that perimeter frame 16 will be level and then fasteners, such as screws, are inserted through apertures 94 into wall 14. Second flange 96 and a flange 98 of frame member 24 that defines channel 40 each have a ramped edge that facilitates insertion of flange 98 over second flange 96. As flange 98 of frame member 24 slides down flange 96 of wall coupler 90, frame 16 is drawn closer to wall 14. If necessary to center frame 16, frame 16 can be slid right or left on wall couplers 90 to a centered position without having to remove frame 16 from wall 14. To remove frame 16 for adjustment of the tension in screen 18 or otherwise, frame 16 is raised up and removed from wall 14.

When coupled to frame 16, perimeter portions 110 of screen 18 overlap respective walls 112 of frame members 24 that form a border for screen 18. A substantially flat display portion 116 of screen 18 is surrounded by perimeter portions 110 and provides a display surface 118 on one side of display portion 116 on which images projected on screen 18 by projector 12 (either front or rear projection) are viewed by the audience seated in front of projection screen apparatus 10. Display surface 118 defines a plane 120 that has a first audience side 122 and an opposite second side 124. Retention rod 56 is positioned on audience side 122 of plane 120 and wall coupler 90 is positioned on opposite side 124.

Wall 112 includes a first corner 126 on its inner edge that causes screen 18 to turn or bend and divides screen 18 into perimeter and display portions 110, 116 as shown in FIG. 16. Wall 112 also includes a second bend 128. Corner 126 and bend 128 assist in suppressing puckering or creasing of screen so that most, if not all, puckering or creasing is removed from screen 18 before reaching display portion 116 so that little or no distortion is caused in display surface 118.

As shown in FIG. 16, frame 16 includes a front side 140 facing the audience and an opposite back side 142. Front side 140 is preferably painted or otherwise colored black and includes a face 144, an outer wall 146, and an inner side wall 148. When screen 18 is coupled to frame 16, display portion 116 of screen 18 defines an angle 150 to suppress images from "washing" onto face 144. Furthermore, face 144 and inner side wall 148 have a radius therebetween that further suppresses washing.

Similarly to the engagement of wall couplers 90 to the back of frame members 24, support rod 250, FIG. 17, is provided with ends that engage flange 98. Support rod 250 provides support and maintains tension when the overall side length of frame members 24 becomes large. Support rod 250 is telescopic with a spring biased member that extends through aligned holes in the telescoping members to hold support rod 250 at an extended length. The retracted length of support rod 250 is preferably less than or about 48 inches.

As mentioned above, in addition to wall mounting, screen apparatus 10 is provided with telescoping legs 150. Legs 150 mount to frame members 24 via leg clips 180 as shown in FIG. 3A. Leg clips 180 couple to frame members 24 using the same bores and screws 29 that are used to couple frame members 24 to bracket 37. Once leg clips 180 are coupled to the frame members 24, thumbscrews 166 of legs 150 threadably engage bores of leg clips 180 to secure legs 150 thereto. Accordingly, it is possible for a user to take a screen apparatus 10 supported by legs 150, remove legs 150, and then mount apparatus 10 via wall couplers 90. Similarly, a wall mounted apparatus 10 can be converted to a leg 150 supported apparatus by reversing the process. Legs 150 may be provided in the same package to the distributor or retainer as the subassemblies of frame 16 and screen 18 or may be provided in a separate package as an option for the overall screen apparatus.

Preferably, instructions for the assembly, installation, and/or use of projection screen apparatus 10 are provided with projection screen apparatus 10 or otherwise communicated to permit a person or machine to assemble, install and/or use projection screen apparatus 10. Such instructions may include a description of any or all portions of projection screen apparatus 10 and/or any or all of the above-described assembly, installation, and use of projection screen apparatus 10 or components of projection screen apparatus 10. The instructions may be provided on separate papers and/or on the packaging in which projection screen apparatus 10 is sold or shipped. These instructions may also be provided over the Internet or other communication system. Furthermore, the instructions may be embodied as text, pictures, audio, video, or any other medium or method of communicating instructions known to those of ordinary skill in the art.

Although the present invention has been described in detail with reference to preferred embodiments, variations and modifications exist within the scope and spirit of the present invention as described and defined in the following claims.

The invention claimed is:

1. A projection screen apparatus comprising:
   a perimeter frame including side members and corner members, the perimeter frame having an audience side viewable by a viewer and a back side opposite the audience side;
   a substantially blank screen tensioned on the perimeter frame, the screen having a substantially flat display portion configured to display an image to the viewer and a perimeter portion coupled to the perimeter frame, the side members including a track, the corner members including a mount coupled to the back side of the perimeter frame; and
   a coupler coupled to the screen and received by the mount of the corner member.

2. The apparatus of claim 1, wherein the side members include a first segment and a second segment, each of the first and second segments being coupled to a first corner member, the track of the first segment tensioning the screen in a first direction, the track of the second segment tensioning the screen in a second direction, the second direction being substantially perpendicular to the first direction, the coupler and mount of the corner member tensioning the screen in a direction having components of the first direction and the second direction.

3. The apparatus of claim 1, wherein the coupler is a strap constructed from hook and loop type material.

4. The apparatus of claim 1, wherein the side members define a greater percentage of the perimeter than the corner members.

5. The apparatus of claim 1, wherein the coupler tensions the screen in a direction towards the corner member.

6. The apparatus of claim 1, wherein the perimeter frame has a front audience side and a back side opposite the audience side, and the mount of the corner member is positioned on the back side of the perimeter frame.

7. The apparatus of claim 1, further including a wall mount supporting the perimeter frame in a substantially vertical use position, the wall mount being at least partially positioned in a channel defined in the back side of the perimeter frame.

8. The apparatus of claim 1, wherein the coupler is a flexible coupler configured to wrap around at least a portion of the mount.

9. A projection screen apparatus comprising:
   a perimeter frame including a plurality of frame members;
   a substantially blank screen tensioned on the perimeter frame, the screen having a substantially flat display portion and a perimeter portion coupled to the perimeter frame, the frame members including a track;
   a first coupler positioned in the track to couple the screen to the perimeter frame; and
   a second coupler coupled to the screen and to a corner portion of the perimeter frame.

10. The apparatus of claim 9, wherein the second coupler is configured to tension the screen in a direction towards the corner portion of the perimeter frame.

11. The apparatus of claim 9, wherein the corner portion includes a bracket, and the second coupler is received by the bracket of the corner portion.

12. The apparatus of claim 11, wherein the plurality of frame members include a first frame member and a second frame member, and the first frame member and the second frame member are substantially perpendicular to each other and are each coupled to the bracket of the corner portion.

13. The apparatus of claim 11, wherein the bracket includes a mount for receiving the second coupler, and the mount is oriented at about a 45 degree angle relative to a longitudinal axis of the frame member.

14. The apparatus of claim 9, wherein the second coupler is a flexible strap coupled to a corner of the screen.

15. The apparatus of claim 9, wherein the first coupler is elongated and has a length that is a majority of the length of the track.

16. A method of assembling a projection screen, the method including:
provaiding a substantially blank projection screen, a perimeter frame, a first coupler, and a second coupler, the perimeter frame including a plurality of frame members, at least one frame member including a track;
coupling the first coupler to a corner portion of the perimeter frame to support the screen on the frame; and
positioning, following the coupling step, the second coupler in the track of the at least one frame member to tension the screen onto the perimeter frame.

17. The method of claim 16, further including, after the positioning step, a step of adjusting the first coupler to tension the screen towards the corner portion of the frame.

18. The method of claim 16, wherein the screen is stretched during the positioning step.

19. The method of claim 16, wherein the first coupler and the second coupler are fixedly attached to the screen.

20. The method of claim 16, wherein the corner portion includes a bracket having a mount configured to receive the first coupler during the coupling step.

21. The method of claim 20, wherein the plurality of frame members include a first frame member and a second frame member, and the first frame member and the second frame member are substantially perpendicular to each other and are each coupled to the bracket of the corner portion.

22. The method of claim 16, wherein the first coupler is a flexible strap and the second coupler is elongated.

* * * * *